Patented May 1, 1951

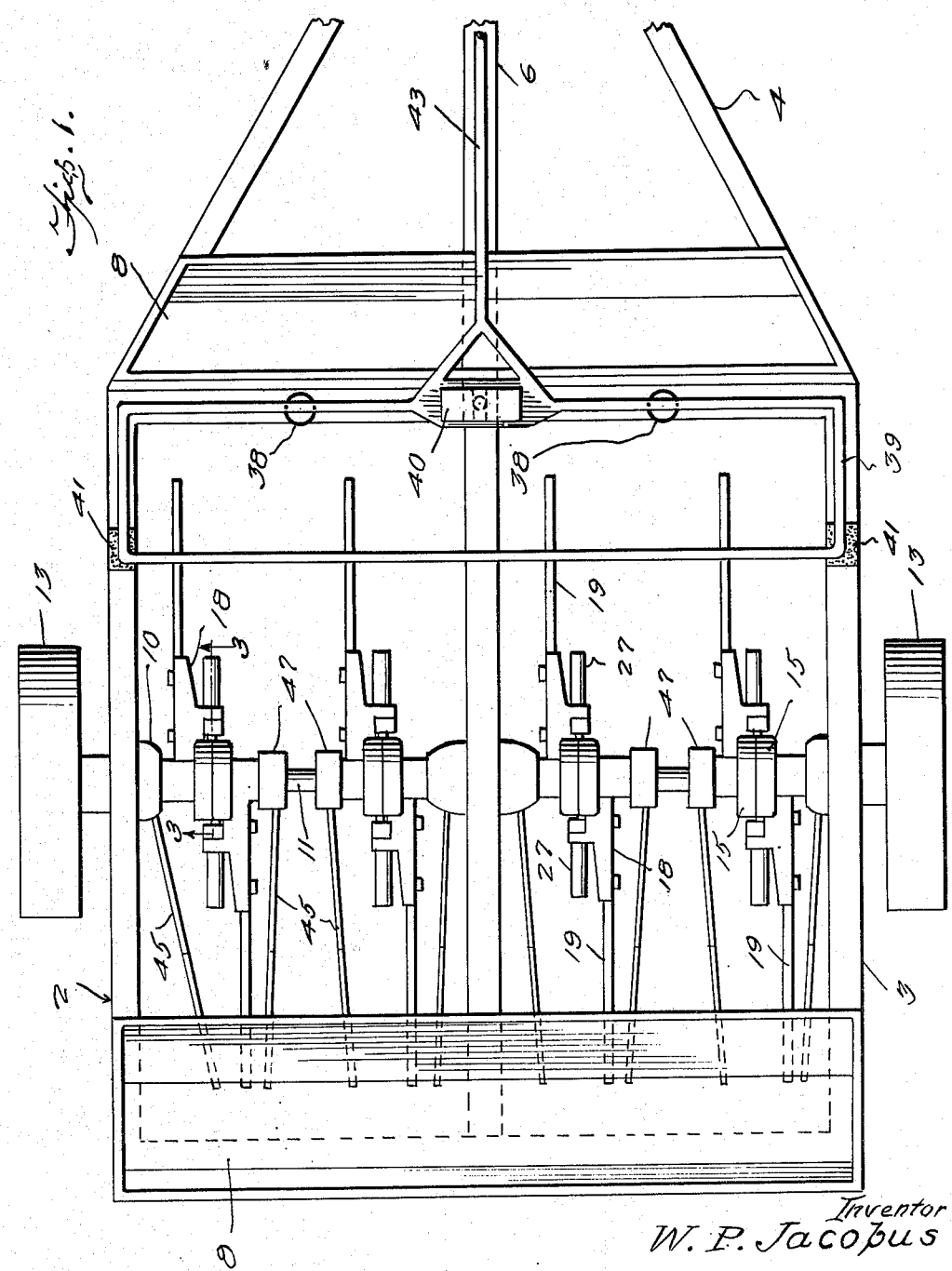

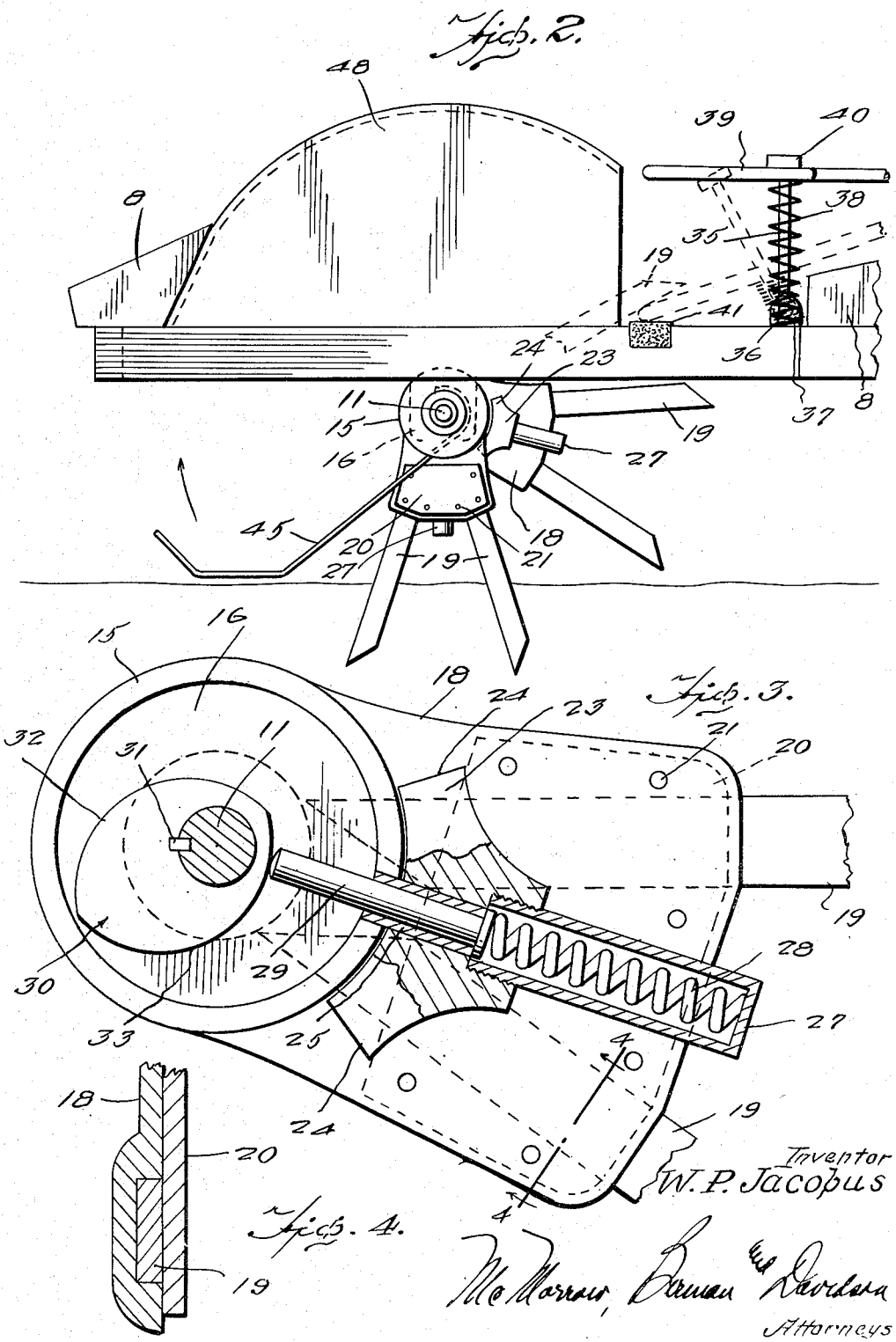

2,551,132

UNITED STATES PATENT OFFICE 2,551,132

ROTARY IMPLEMENT

Willis P. Jacobus, Hutchinson, Kans.

Application January 4, 1946, Serial No. 638,959

3 Claims. (Cl. 97—52)

This invention relates to an improved agricultural machine and more particularly to a ground penetrating implement for the more efficient absorption of rainfall.

An object of this invention is to provide an agricultural machine of the kind to be more particularly described hereinafter, by which the closely packed dry top soil may be penetrated and broken, forming spaced apart openings into which water may pass and be absorbed.

Another object of this invention is to provide a device of this kind having means tensioned during the first half of the rotation of a soil penetrating rotor for rotating the same during the second half of its rotation.

With the above and other objects in view, my invention consists in the arrangement, combination and details of construction disclosed in the drawings and specification, and then more particularly pointed out in the appended claims.

In the drawings:

Figure 1 is a top plan view of my invention after the removal of the cover associated therewith, showing the soil penetrating prongs extending in opposite directions, for the sake of clearness.

Figure 2 is a fragmentary side elevation with the wheels removed.

Figure 3 is an enlarged fragmentary section taken substantially on the line 3—3 of Figure 1.

Figure 4 is a fragmentary detail section taken on the line 4—4 of Figure 3.

Referring to the drawings, the numeral 2 designates generally a horizontally disposed frame having a substantially rectangular main section and a forwardly tapering section 4. This frame includes a longitudinal intermediate bracing member dividing the structure into two symmetrical sections.

Upon the top of and near the rear end of the main part is mounted a rack or box 8 to receive extra weight, as ground conditions may require, such as concrete blocks, iron weight, etc. A similar rack is mounted on the front part and adjacent the end of the main section.

To the intermediate part of the inner sides of the longitudinal members of the main frame section 2 is secured a hanger 10 for fixing thereto a stationary shaft 11.

Upon the shaft 11, are mounted several rotatable assemblies for loosening and penetrating the soil, each assembly comprising a pair of confronting cup-shaped hub sections 15 rotatable on the shaft 11. Each hub section 15 consists of a cylindrical part open at the end adjacent its confronting part and having at the other end a wall 16 through which the shaft 11 extends. Thus the two hub sections 15 form a dust proof housing for containing a lubricant. A flange 18 extends from the outer end of each hub section 15 and is provided on its outer side with a pair of outwardly diverging grooves within which the prongs 19 are adapted to be secured. Plates 20 are attached by fastening members 21 to the outer side of the flanges 18 and secure the prongs 19 to the assembly, as noted in Figure 4. Each flange 18 carries on its inner side a segmental block 23 having radially extending end edges 24 for bearing against the corresponding end edges of a similar block 23 on the adjacent confronting hub section 15 of the assembly.

Each block 23 has a radial bore for a bushing 25 registering at the outer end with a tapped recess for the inner end of a sleeve 27 closed at the outer end. The sleeve 27 contains a spring 28 which presses with its inner end against the enlarged head of a plunger 29, the shank of which is slidable in the bushing 25. The plunger 29 and sleeve 27 extend through an opening in the cylindrical wall of the hub section 15 providing a guide for the plunger 29 as it bears at its end against the curved edge surface of a stationary cam 30. The substantially elliptical cam 30 is fixed near one end of the major axis to the stationary shaft 11 by a key 31, with the greater portion of the major axis thereof directed rearwardly and downwardly. The shape of the cam 30 is asymmetrical as the upper curved surface 32 on one side of the major axis is somewhat flatter than the curved surface 33 on the other side.

An upstanding lever 35 is pivoted to the longitudinal brace at the junction of the front and the main frame parts upon a horizontal pin 36 inserted through the legs of a bifurcated lug 37 secured to the frame 2. A pair of vertical coil springs 38, one on either side of the rod 35 and supported by the front bar of the main section 2, bear at their upper ends against the underside of the front bar of a rectangular locking frame 39. This front bar has a central recess for the upper end of the lever 35 and a cap 40 overlying the upper end of the lever. The rectangular frame 39 has a width equal to the width of the vehicle frame 2 and also includes a rear bar adapted to bear against a pair of rubber bumpers 41 attached to the upper side of the main frame 2. The locking frame 39 has on the intermediate part of its front bar a handle 43 whereby the locking frame may be swung about the horizontal pin 36 from the full to the dotted line position as shown in Figure 2, for engaging one of the prongs 19, as shown dotted in Figure 2, and locking it against rotation. A forward or reverse movement of the handle 43 releases the prong 19 and again sets the machine into position for further operation.

Downwardly and rearwardly extending clearance rods 45 are attached to the collars 47 fixed upon the shaft 11 between each pair of hubs 15.

A removable cover or guard 48 extends between the side members of the frame 2 and covers the prongs 19 above the frame.

In the use and operation of the implement, one prong 19 is disposed for engagement in the ground to thereby initially rotate the hub section 15 about the shaft 11. During the first half of the rotation, the plunger 29 is pressed away from the shaft 11 and the spring 28 is thereby compressed. After the plunger 29 has passed the high point of the fixed hand 30, the tension on the plunger continues the rotation, as the flattened cam surface 32 provides a path of least resistance on which the stored energy of the expanding spring 28 is expended.

The prongs 19 of the adjacent hub section 15 and flange 18 have, in the meantime, engaged in the ground. The spacing block 23 of the adjacent flange 18 has a radial flat end 24 which bears against the similar ends 24 of the spacing block 23 on the first flange 18.

If the handle 43 is swung from the full line to the dotted line position, shown in Figure 2, the first prong 19 will engage the rear bar of the locking frame 39 for locking the hub sections 15 against rotation.

By engagement of the blocks 23, the hub section 15 of which the prongs 19 are in the ground, may carry the adjacent hub section 15 of which the prongs are leaving the ground, over the high point of the cam 30, if and when the ground resistance has not already done so. Both members 15 of an assembly operate on the same cam 30 or may operate on separate cams.

As the machine is drawn forward, the prongs 19 enter the ground at an angle and are rotated by the forward movement of the machine. During the rotation, the spring 28 is compressed by the action of the plunger 29 on the cam 30. As the plunger 29 passes the high point of the cam 30, the spring 28 turns the prongs 19 about the shaft 11 into a position to reenter the ground. The two sections 15 of the assembly rotate on the axle 11 in a manner whereby the prongs 19 of each hub 15 will leave the ground as the plunger 29 passes over the outer or higher point of the cam 30. If the soil resistance to the prongs 19 fails to carry the plunger 29 past the high point of the cam 30, the other hub member 15, by means of the engagement of the spacing blocks 23, will cause the first hub member to pass the high point of the cam 30 and reenter the ground.

I do not mean to confine myself to the exact details of construction herein disclosed, but claim all variations falling within the purview of the appended claims.

I claim:

1. An agricultural implement of the kind described comprising a frame, a shaft, a pair of ground engaging implements rotatably mounted on the shaft, said implements including a hub, a pair of ground engaging prongs on each of said hubs, a substantially elliptical cam fixed on said shaft within said hub, the major axis of said cam extending downwardly and rearwardly of said frame, and a spring pressed radial plunger midway between said prongs engaging said cam, said prongs being disposed on said shaft for penetrating the ground and rotating said implement upon forward movement of said frame, said plunger acting on said cam for returning said prongs to initial ground engaging position.

2. An agricultural implement of the kind described comprising a shaft, a pair of ground engaging implements rotatably mounted on the shaft, said implements including a hub, a pair of ground engaging prongs on each of said hubs, confronting segmental abutment blocks on each of said hubs, a substantially elliptical cam fixed on said shaft, the major axis of said cam extending downwardly and rearwardly, a spring pressed radial plunger midway between said prongs engaging said cam, said prongs being disposed on said shaft for penetrating the ground and rotating said implement upon forward movement of the implement, said plunger acting on said cam for returning said prongs to initial ground engaging position, the abutment block of one of said hubs being engageable with the confronting block for rotating said latter block and related hub upon failure of the latter mentioned hub to initially complete its rotation about said shaft.

3. An agricultural implement of the kind described comprising a frame, a shaft, a pair of ground engaging implements rotatably mounted on said shaft, said implements including a hub, a pair of ground engaging prongs on each of said hubs on one side thereof, a substantially elliptical cam fixed near one end of said shaft within said hub, the major axis of said cam extending downwardly and rearwardly of said frame, a spring pressed radial plunger midway between said prongs engaging said cam, said prongs being disposed on said shaft for penetrating the ground and rotating said implements upon forward movement of the frame, said plunger acting on said cam for returning said prongs to initial ground engaging position, and a stop member carried by said frame engageable with said prongs for stopping the rotation of said ground penetrating members above the surface of the ground.

WILLIS P. JACOBUS.

REFERENCES CITED

The following references are of record in the file of this patent:

FOREIGN PATENTS

| Number | Country | Date |
|---|---|---|
| 184,380 | Great Britain | Aug. 17, 1922 |
| 404,120 | Germany | Oct. 13, 1924 |